United States Patent Office 2,951,860
Patented Sept. 6, 1960

2,951,860

ORGANOSILICON HYDROXY PHOSPHATE ESTERS

Edwin P. Plueddemann, Midland, Mich., assignor to Dow Corning Corporation, Midland, Mich., a corporation of Michigan No Drawing. Filed Nov. 15, 1957, Ser. No. 696,638

3 Claims. (Cl. 260—448.2)

This invention relates to new organosilicon epoxide-phosphorus acid derivatives.

A new class of compositions was disclosed in applicant's copending application Serial No. 618,669, filed October 29, 1956, now abandoned, which application is included herein by reference. This new class of compositions comprises organosilicon epoxides in which an epoxy-containing radical is attached to a silicon atom through a carbon-silicon linkage. Now another new class of compositions has been produced by reacting the epoxide groups of the compositions of the aforesaid copending application with a phosphorus acid to produce an organosilicon hydroxy phosphate ester.

This invention relates to a composition of matter comprising an organosilicon compound having attached to at least one of the silicon atoms by a silicon-carbon linkage at least one organic radical containing at least one radical (A) of the formula

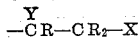

in which each R is a hydrogen atom or a monovalent hydrocarbon radical and each X and each Y is a hydroxyl radical or a phosphorus radical of the formula

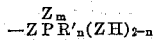

in which each R' is a monovalent hydrocarbon radical, a hydrogen or a halogen atom, each $m$ has a value from 0 to 1, each Z is oxygen or sulfur and each $n$ has a value of from 0 to 2. In any single radical (A) at least one X or Y is a phosphorus radical. Any remaining valences of the silicon atoms in said organosilicon compound are satisfied by hydrocarbon radicals, halogenated hydrocarbon radicals, hydrocarbonoxy radicals, halogenohydrocarbonoxy radicals, hydroxyl radicals, hydrogen atoms and oxygen atoms.

The term "hydrocarbon radicals" includes both monovalent hydrocarbon radicals and divalent hydrocarbon radicals attached to silicon. Operative monovalent hydrocarbon radicals include alkyl radicals, e.g. methyl, isopropyl, tert-butyl and stearyl; alkenyl radicals, e.g. vinyl, allyl, methallyl and butadienyl; cycloalkyl radicals, e.g. cyclopentyl, cyclohexyl and undecahydrodiphenyl; cycloalkenyl radicals, e.g. cyclopentenyl, 2,6-dimethylcyclooctadienyl and cycloheptadecenyl; aryl radicals, e.g. phenyl, xenyl and naphthyl; alkaryl radicals, such as the tolyl radical, and aralkyl radicals, such as the benzyl radical. These monovalent hydrocarbon radicals are also examples of R and R'.

As stated above, divalent hydrocarbon radicals attached to other silicon atoms, i.e. silcarbanes, are included within the scope of this invention. The connecting hydrocarbon groups can contain singly or in any combination such radicals as methylene, vinylene, vinylidene, cyclohexylidene, phenylene, tolylene, toluenyl and toluylene.

Similarly, the corresponding halogenated radicals attached to silicon, i.e. monovalent and divalent hydrocarbon radicals containing halogen atoms such as chlorine, bromine, iodine or fluorine atoms, are also included within the scope of this invention. Such radicals include chloromethyl, 1,2-dibromovinyl, 2,4,6-triiodocyclohexyl, 3-bromocyclopentene-2,3-yl, 2,4-dichloro-6-bromophenyl, α,α,α-trifluorotolyl, α,α-dichlorobenzyl, bromoethylene, iodophenylene and chloroxenylene.

The term "hydrocarbonoxy radical" refers to a radical of the formula RO— where R is a hydrocarbon radical. The term "halogenohydrocarbonxy radical" refers to a radical of the formula RO— where R is a halogenated hydrocarbon radical. The unutilized oxygen bond can be attached to carbon atoms in other radicals or to a silicon atom. The hydrocarbon and halogenohydrocarbon radicals referred to here are more fully defined above. It is to be understood, however, that the above-listed operative radicals are merely a representative list and do not represent limits to this invention.

It can be readily seen from the above that the Si atom to which the particular class of groups of this invention is fastened can be connected to other silicon atoms through Si—O—Si bonds, Si—R''—Si bonds, Si—(R''O)$_n$—Si bonds, SiR''(OR'')$_n$Si bonds and Si—O(R''O)$_n$—Si bonds where R'' represents divalent hydrocarbon and halogenohydrocarbon radicals. This invention also includes silanes and siloxanes containing silicon-bonded hydrogen atoms and hydroxyl groups.

The compositions of this invention are best prepared by reacting an organosilicon epoxide of the type disclosed in the aforesaid copending application with an acid of the phosphorus family under conditions such as those shown in the subsequent working examples.

The organosilicon epoxides employed in applicant's preferred method are further described in applicant's aforesaid copending application. Two basic methods of preparation of these epoxides are shown therein. The first method is the reaction of an organo-silicon compound containing a radical having a C=C linkage with peracids such as peracetic, perbenzoic and perpropionic acids, thereby oxidizing the double bond to yield an epoxy group. The second method is that of adding an unsaturated organic compound containing at least one epoxy group to a silicon compound containing at least 1 SiH group preferably in the presence of platinum, ultraviolet light, organic peroxides or other silane addition catalyst. The epoxidized radical can, therefore, consist of an epoxy group connected directly to a silicon atom or can be connected to the silicon through a variety of linking chains such as any combination of hydrocarbon radicals, e.g. methylene, vinylene, ethylene, butylene, phenylene, xenylene, tolylene, tolyuenyl, toluylene, divalent ether radicals of the type (ROR)$_x$ where $x$ is at least one, e.g.

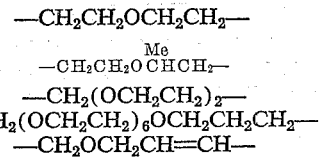

and

and cycloalkyl structures producing a configuration such as

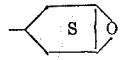

Also included in the operative linking chains are any of the above types of divalent hydrocarbon radicals which contain hydroxyl groups attached to the chain. Every silicon in the compositions employed in this invention can have attached thereto initially epoxide groups or only one silicon per molecule can have such a group. The epoxidized radicals employed herein can also contain more than one epoxy group, for instance, where a butadienyl radical attached to silicon is oxidized with a peracid to produce the corresponding diepoxy radical.

Examples of phosphorus compounds which are operative in this invention include the inorganic acids, such as orthophosphoric, polyphosphoric, metaphosphoric, ultraphosphoric, hypophosphoric, pyrophosphoric, phosphorous, hypophosphorous, pyrophosphorous and chlorophosphoric acids; the organic acids, such as phosphinous, phosphonous, phosphonic and phosphinic acids; incomplete acid salts, such as acid phosphates and monoorganophosphites, and the corresponding thio and thiono compounds of phosphorus. In any case, to be operative the phosphorous compound must contain at least one acid hydrogen atom, i.e. a hydrogen atom which is attached to phosphorous through an oxygen or sulfur atom and which will dissociate from that oxygen or sulfur. Where a given acid has more than one active acid hydrogen, e.g. orthophosphoric or phosphorous acids, the acid can react with more than one epoxide group thereby connecting two silicon atoms through a linkage such as the SiR"OPOR"Si type. Some sufficiently dissociated phosphorus acids will react with the hydroxyl group produced with the phosphate ester to produce a double ester in which the phosphorus groups may be the same or different.

Neutral compositions of this invention, i.e. those prepared with an equivalent or excess amount of epoxide groups in proportion to the phosphorus acid groups, have improved lubricity and fire resistance over the unmodified silicone. Acid compositions of this invention, i.e. those prepared with an excess of acid groups in proportion to the epoxide groups, are excellent curing agents for epoxy resins, urea resins, melamine resins and the like. The acid compositions also are excellent primers on steel for improving the adhesion of such resins. The acids of trivalent phosphorus are mild reducing agents and are therefore useful as oxidation stabilizers or color inhibitors in alkyd resins.

After the epoxide-acid reaction is complete, the product can be stabilized by dilution with water or alcohol. It should be noted that if alcohol is used for stabilization, the ultimate films tend to be soft.

The following examples are merely illustrative of the preparation of compositions of this invention and are not intended to limit this invention which is properly delineated in the claims.

Film hardness was determined by pressing sharpened pencils against the film while drawing a line. The hardness of the pencil leaving a permanent mark in the film gives sufficient value for comparisons. This test was always conducted by the same person to give consistency to the results. The term Vi represents the vinyl radical.

EXAMPLE 1

15 grams of (A) an 85% by weight $H_3PO_4$-in-water solution equivalent to .13 mol of $H_3PO_4$ were added slowly to (B) a solution in 70 grams of acetone of 20 grams of

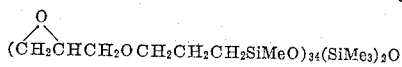

These proportions gave a ratio of $H_3PO_4$ molecules to epoxy radicals of 1.16:1. A clear solution resulted containing

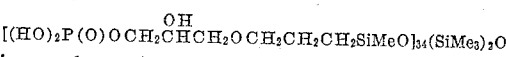

This cured on glass in 16 hours at 120° C. to a clear tough film insoluble in water.

A portion of the product solution was neutralized with ammonium hydroxide. The resulting ammonium salt cured on glass in 10 minutes at 120° C. to a tack-free film resistant to water for at least one hour at 70° C.

Both of the above products were employed as primer coats on steel and gave improved adhesion to silicone rubber.

EXAMPLE 2

25 grams of solution (A) of Example 1, equivalent to .216 mol of $H_3PO_4$, were added slowly to solution (B) of Example 1. The ratio of mols of $H_3PO_4$ per mol of epoxy radical was 1.94:1. This mixture was refluxed for 15 minutes and allowed to cool. The resulting clear stable solution was miscible with water and contained for the most part

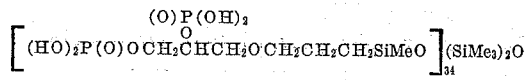

This solution cured slowly at 120° C. and was still tacky after 4 hours at that temperature.

A portion of this solution was neutralized with ammonium hydroxide. The resulting ammonium salt cured to a tack-free state in 15 minutes at 120° C.

EXAMPLE 3

15 grams of solution (A) of Example 1 were added slowly to (C) a solution in 70 grams of acetone of 20 grams of

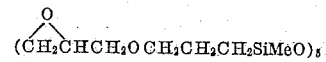

The resulting product

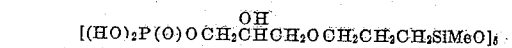

was water-soluble but cured in one hour at 150° C. to an insoluble heat-stable film having a pencil hardness of 8H.

EXAMPLE 4

30 grams of solution (A) of Example 1 were added slowly to solution (C) of Example 3. The resulting product was

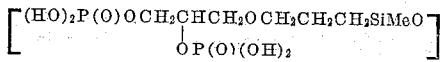

which cured in one hour at 150° C. to a clear tack-free film having a pencil hardness of 5H.

EXAMPLE 5

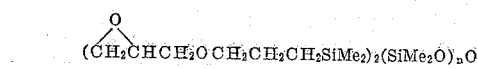

where $n$ was approximately 30, was added slowly to $C_6H_5P(O)(OH)_2$ refluxing in acetone in amount equal to 1 mol of siloxane per 2 mols of acid. The resulting compound

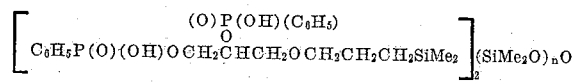

is an excellent primer for steel.

EXAMPLE 6

10.86 grams (.03 mol) of

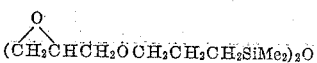

were heated to 140° C. 4.74 grams (.03 mol) of $C_6H_5P(O)(OH)_2$ were added slowly with constant stirring. The mixture was heated one hour at 140° C. The product was a water-white fluid polymer having a viscosity at 25° C. of 150,000 cs. and the unit formula.

This fluid was found to be an excellent curing agent for epoxy resins.

EXAMPLE 7

The product of Example 6 was dissolved in diethylene glycol-dimethyl ether to make a 60 percent by weight solution—solution (D). 7 parts by weight of solution (D) were mixed with 3 parts by weight of a 60 percent by weight solution of a urea-formaldehyde resin in a mixture of buantol and xylene. This mixture cured in one hour at 130° C. to a clear tough flexible tack-free film.

EXAMPLE 8

The product of Example 6 was added in the form of solution (D) to two resin mixtures in the amounts shown in Table I. Each resin mixture consisted of a 50% by weight solution of 2,2-bis(4,4'-dihydroxyphenyl)propane-epichlorohydrin condensation product in a solvent consisting of xylene, ethyl Cellosolve acetate, and methyl Cellosolve in a weight ratio of 2:2:1. Resin I had a molecular weight of approximately 900. Resin II had a molecular weight of approximately 1400. Each mixture was cured for one hour at 150° C. to give clear films with the properties shown.

Table I

| Properties with— | Percent by weight (on solids basis) of product of Example 6 | | |
|---|---|---|---|
|  | 2 | 4 | 10 |
| Resin I: |  |  |  |
| Pencil hardness | F | F | H. |
| Characteristics | Brittle | Less brittle | Tough. |
| Resin II: |  |  |  |
| Pencil hardness | 4H | 4H | 4H. |
| Characteristics | Very brittle | Brittle | Moderately tough. |

EXAMPLE 9

When solution (A) of Example 1 is added slowly to an acetone solution of each of the following compounds in such amounts as to add one mol of $H_3PO_4$ per epoxy radical, the resulting products are as follows:

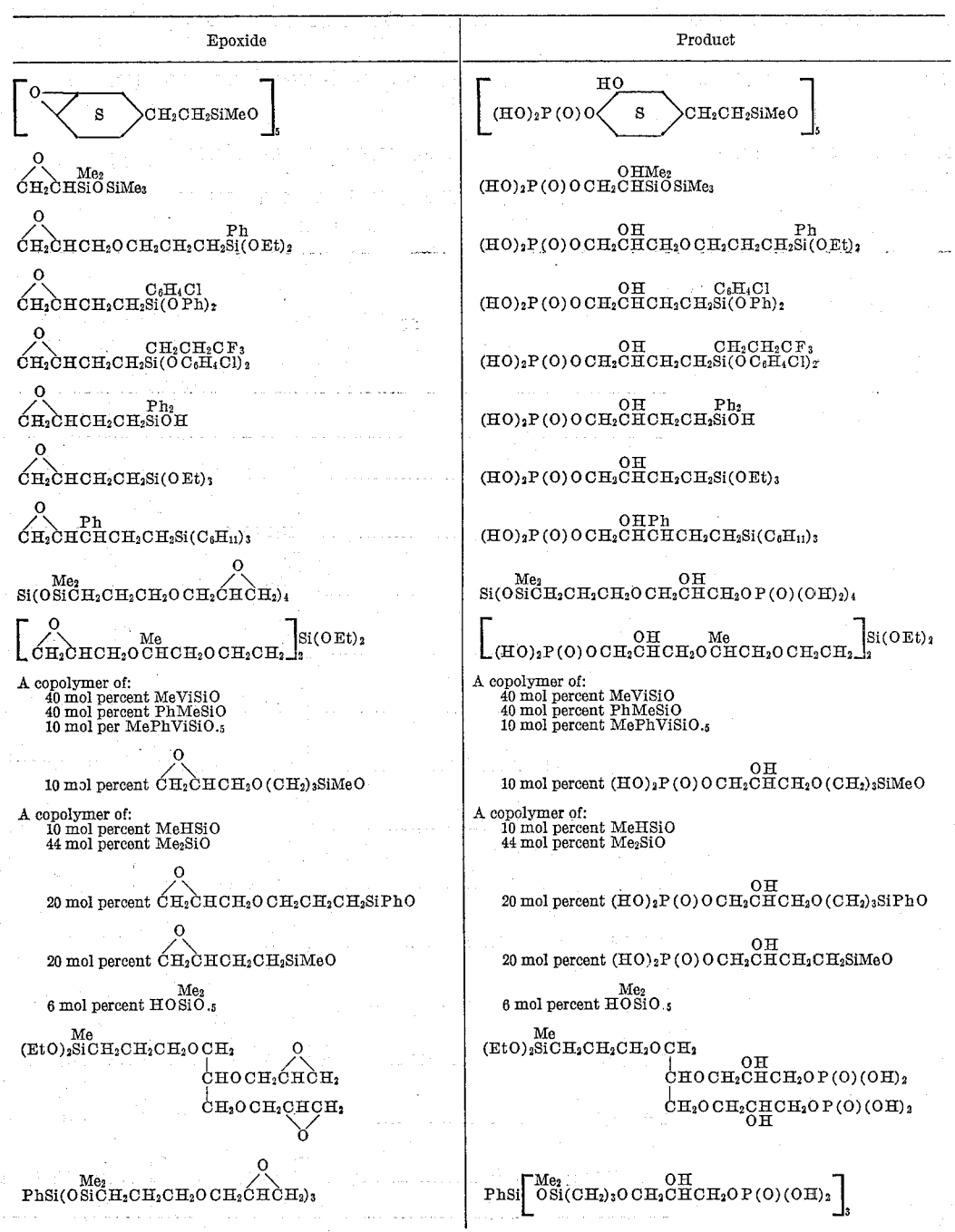

EXAMPLE 10

When solution (A) of Example 1 is added slowly to acetone solutions of polysiloxanes containing the following units in such amounts as to add one mol of $H_3PO_4$ per epoxy radical, the siloxane units will be modified as shown:

in an acetone solution is added slowly to the following phosphorus compounds in water or solvent solutions such that there are two mols of the phosphorus compound per

| Epoxide | Product |
|---|---|
| $CH_2CH\langle\bigcirc\rangle SiMeO$ (with epoxide O) | $(HO)_2P(O)OCH_2\overset{OH}{C}H\langle\bigcirc\rangle SiMeO$ |
| $CH_2\overset{O}{-}\overset{Me}{C}CH_2CH_2\overset{Me}{C}HCH_2SiMeO$ | $(HO)_2P(O)OCH_2\overset{OH}{C}(Me)CH_2CH_2\overset{Me}{C}HCH_2SiMeO$ |
| $CH_2CHCH_2O(CH_2)_3SiPhO$ (epoxide) | $(HO)_2P(O)OCH_2\overset{OH}{C}HCH_2O(CH_2)_3SiPhO$ |
| $Me_2C\overset{O}{-\!\!\!-}CHCH_2CH_2SiMeViO_{0.5}$ | $(HO)_2P(O)O\overset{Me_2COH}{C}HCH_2CH_2SiMeViO_{0.5}$ |
| $\overset{O}{CH_2CH}CH_2OCH_2\overset{OH}{C}HCH_2O(CH_2)_3SiO_{1.5}$ | $(HO)_2P(O)OCH_2\overset{OH}{C}HCH_2OCH_2\overset{OH}{C}HCH_2O(CH_2)_3SiO_{1.5}$ |
| $Me\overset{O}{C}HCHCH_2CH_2\overset{Me}{Si}(OSiMe_3)_2$ | A mixture of: $(HO)_2P(O)O\overset{MeOH}{C}HCH_2CH_2\overset{Me}{Si}(OSiMe_3)_2$ and $(HO)_2P(O)O\overset{Me}{C}HCH_2CH_2\overset{Me}{Si}(OSiMe_3)_2$ with $MeCHOH$ |

EXAMPLE 11

When  mol of siloxane, the compounds shown below are produced. Heat accelerates the reaction.

$(CH_2\overset{O}{C}HCH_2OCH_2CH_2CH_2SiMe_2)_2O$

| Phosphorus compound | Product |
|---|---|
| Phosphorous acid | $[(HO)PH(O)OCH_2\overset{OH}{C}HCH_2O(CH_2)_3SiMe_2]_2O$ |
| Hypophosphorous acid | $[H_2P(O)OCH_2\overset{OH}{C}HCH_2O(CH_2)_3SiMe_2]_2O$ |
| Do | $[(HO)\overset{(O)(O)}{PHOP}(OH)OCH_2\overset{OH}{C}HCH_2O(CH_2)_3SiMe_2]_2O$ |
| Pyrophosphorous acid | $[(HO)\overset{(O)(O)}{PHOPHO}CH_2\overset{OH}{C}HCH_2O(CH_2)_3SiMe_2]_2O$ |
| Do | $[(HO)_2\overset{(O)(O)}{POP}(OH)OCH_2\overset{OH}{C}HCH_2O(CH_2)_3SiMe_2]_2O$ |
| Chlorophosphoric acid | $[ClP(O)(OH)OCH_2\overset{OH}{C}HCH_2O(CH_2)_3SiMe_2]_2O$ |
| Lithiophosphoric acid | $[(HO)P(O)(SH)SCH_2\overset{OH}{C}HCH_2O(CH_2)_3SiMe_2]_2O$ |
| Thionophosphoric acid | $[(HO)_2P(S)OCH_2\overset{OH}{C}HCH_2O(CH_2)_3SiMe_2]_2O$ |
| Ethylphosphonous acid | $[EtHP(O)OCH_2\overset{OH}{C}HCH_2O(CH_2)_3SiMe_2]_2O$ |
| p-Tolylvinylphosphinic acid | $[Me\langle\bigcirc\rangle\overset{Vi}{P}(O)OCH_2\overset{OH}{C}HCH_2O(CH_2)_3SiMe_2]_2O$ |
| Methylthiothionophosphonous acid | $[MeHP(S)SCH_2\overset{OH}{C}HCH_2O(CH_2)_3SiMe_2]_2O$ |
| Dibutylphosphate | $[(BuO)_2P(O)OCH_2\overset{OH}{C}HCH_2O(CH_2)_3SiMe_2]_2O$ |
| Phenylthionophosphonate | $[PhHP(S)OCH_2\overset{OH}{C}HCH_2O(CH_2)_3SiMe_2]_2O$ |

That which is claimed is:

1. A composition of matter comprising an organosilicon compound having attached to at least one of the silicon atoms by a silicon-carbon linkage at least one organic radical containing at least one radical (A), any remaining atoms in said organic radical being selected from the group consisting of carbon, hydrogen and oxygen in the form of ether linkages and hydroxyl groups, (A) being of the formula $$-\overset{Y}{C}R-CR_2-X$$

in which each R is selected from the group consisting of the hydrogen atom and monovalent hydrocarbon radicals, each X and each Y is selected from the group consisting of the hydroxyl radical and a radical of the formula $$-ZP\overset{(Z)_m}{R'_n}(ZH)_{2-n}$$

in which each R' is of the group consisting of hydrogen, halogen and monovalent hydrocarbon radicals, each $m$ has a value of from 0 to 1, each Z is selected from the group consisting of oxygen and sulfur atoms and each $n$ has a value from 0 to 2, and at least one of X and Y in any single radical (A) is a phosphorus radical, any remaining valences of the silicon atoms in said organosilicon compound being satisfied by substituents of the group consisting of hydrocarbon radicals, halogenohydrocarbon radicals, hydrocarbonoxy radicals, halogenohydrocarbonoxy radicals, hydroxyl radicals, hydrogen atoms and oxygen atoms of $\equiv$SiOSi$\equiv$ linkages.

2. The composition of claim 1 where Z is oxygen.

3. A composition of matter comprising an organosilicon compound having attached to each of at least one of the silicon atoms by a silicon-carbon linkage at least one organic radical containing at least one radical (A), any remaining atoms in said organic radical being selected from the group consisting of carbon, hydrogen and oxygen in the form of ether linkages and hydroxyl groups, radical (A) having the formula $$-\overset{Y}{C}R-CR_2-X$$

in which each R is selected from the group consisting of the hydrogen atom and monovalent hydrocarbon radicals, each X and each Y is selected from the group consisting of the hydroxyl radical and a radical of the formula $$(-Z)_aP\overset{(Z)_m}{R'_n}(ZH)_{3-a-n}$$

in which each R' is selected from the group consisting of hydrogen atoms, halogen atoms and monovalent hydrocarbon radicals, each Z is selected from the group consisting of oxygen and sulfur atoms, each $a$ has a value of from 1 to 3, each $m$ and each $n$ has a value of from 0 to 1 and the sum of $a$ and $n$ is no greater than 3, and at least one of X and Y in any single radical (A) is a phosphorus radical, any remaining valences of the silicon atoms in said organosilicon compound being satisfied by substituents selected from the group consisting of hydrocarbon radicals, halogenohydrocarbon radicals, hydrocarbonoxy radicals, halogenohydrocarbonoxy radicals, hydroxyl radicals, hydrogen atoms and oxygen atoms of $\equiv$SiOSi$\equiv$ linkages.

References Cited in the file of this patent
UNITED STATES PATENTS

| | | |
|---|---|---|
| 2,811,540 | Cooper | Oct. 29, 1957 |
| 2,819,245 | Shorr | Jan. 7, 1958 |
| 2,864,845 | Kerschner et al. | Dec. 16, 1958 |

UNITED STATES PATENT OFFICE
CERTIFICATE OF CORRECTION

Patent No. 2,951,860            September 6, 1960

Edwin P. Plueddemann

It is hereby certified that error appears in the printed specification of the above numbered patent requiring correction and that the said Letters Patent should read as corrected below.

Columns 7 and 8, Example 11, in the table, under the heading "Phosphorus compound", line 7, for "Lithiophosphoric acid" read -- Dithiophosphoric acid --.

Signed and sealed this 4th day of April 1961.

(SEAL)
Attest: ERNEST W. SWIDER

~~KARL H. AXLINE~~
Attesting Officer

ARTHUR W. CROCKER
Acting Commissioner of Patents